UNITED STATES PATENT OFFICE.

KEIZO SAKURAI, OF SAN FRANCISCO, CALIFORNIA, ASSIGNOR OF ONE-THIRD TO GUSTAV ABRAHAMSON, OF SAN FRANCISCO, CALIFORNIA.

FIREPROOF MATERIAL.

No. 855,136.     Specification of Letters Patent.     Patented May 28, 1907.

Application filed December 1, 1905. Serial No. 289,869.

*To all whom it may concern:*

Be it known that I, KEIZO SAKURAI, a citizen of Japan, residing in the city and county of San Francisco and State of California, have invented new and useful Improvements in Fireproof Materials, of which the following is a specification.

My invention relates to a fireproof building material. Its object is to provide a light, strong brick or tile which will be unaffected either by heat or water, or by heat and water combined.

Terra cotta, artificial stone and like materials commonly used in "fireproof" buildings are not as a rule fireproof, since they are liable to suffer disintegration if water is brought into contact with them while they are in a highly heated condition.

I have discovered an argillaceous material existing in a natural state, which is capable of being combined with ordinary clays in such a manner as to possess the desiderata of lightness, strength, and resistance to the disintegrating and destroying forces of heat and water. This material which forms the basis of my invention is found in certain localities in California at least, and is characterized chemically by having the notably low specific gravity of .6 and yielding the following analysis:

| | |
|---|---:|
| $H_2O$ | 12.33% |
| $SiO_2$ | 51.13 |
| $Al_2O_3$ | 28.90 |
| $Fe_2O_3$ | .30 |
| $CaO$ | .95 |
| $MgO$ | .22 |
| Sulfur (in chemical combination with other materials) | 6.17 |
| | 100.00% |

The specific gravity of common clay is ordinarily from 2.3 to 2.5, or about four times that of my material which I am unable to classify other than by its physical and chemical aspects.

A certain amount by volume of my material weighs but 12.1 grams while the same volume of common clay (specific gravity 2.5) weighs 37 grams; or as 1 to 3 for equal volumes.

The most common physical characteristics of my material are its extreme lightness and its chalky appearance. It is easily ground or powdered into an extremely fine powder or dust with a notable lack of gritty or hard crystalline particles. It is very absorptive and mixed with sufficient water it forms a moderately plastic paste but dries slowly in the atmosphere at ordinary temperatures. The fact that it does dry slowly may account to some extent for its freedom from checking or cracking when made into bricks or tiles. Chemically it does not appear to have its silicon oxid so inseparably combined with its aluminium oxid as is the case with most clays.

In practice I take a suitable amount of this material finely ground or powdered as a vehicle, and a suitable amount of pulverized clay, or other appropriate binder, and treat the mixture with water to form a paste. This paste is then molded and baked to form permanent articles of commerce of any desired description.

If fire clay is used as a binder I employ about six parts of fire clay to ten parts of my material. If common clay is used I employ about four parts to ten of my material. These proportions vary more or less according to the binders used and according to the class of goods to be manufactured.

I may employ a binder which consists of a gypsum-bearing clay, heated to about 200° C. to remove the water of the gypsum and reduce the latter to "dead burnt gypsum," but without destroying the plasticity of the original clay. This binder is used in about the same proportions as common clay above noted; that is four parts of the binder to ten of my material.

Bricks or tiles made from this material show a crushing strength considerably in excess of that of bricks or tiles of equal size made from ordinary clay.

I have also experimented with other argillaceous vehicles varying in specific gravity from .6 to 1.3 and having otherwise the general characteristics of the material herein described, to wit: pulverulence, absorptiveness, plasticity &c. and have in every instance produced a brick of greater strength lightness and indestructibility than the ordinary brick or tile.

The principal characteristic of a brick or tile, such as I have been able to produce as above described are: (1) that it is from 30 to 40% lighter than an ordinary brick of the same size and yet possesses greater crushing strength than the ordinary brick. (2) That my brick is more easily kilned than an ordinary clay brick, and requires much less fuel for baking. (3) Being porous it conducts heat slowly and withstands a very high degree of heat. (4) It is unaffected if water is thrown on it when highly heated; this is due apparently to the finely pulverized character of my vehicle.

The main deductions from my discovery are, the necessity of a vehicle: (1) Of a low specific gravity, say not to exceed one-half that of the clay binder; (2) which is capable of being reduced to a very fine powder; (3) which possesses not less than 40% of silicon oxid; (4) which possesses not to exceed 40% of aluminium oxid. Less than (40%) forty per cent. of silicon oxid is fatal to good results, just as too much aluminium oxid is bad. Differently expressed the vehicle is notable for its lightness, its pulverulence, its strength, its plasticity and its absorptive quality.

Having thus described my invention, what I claim and desire to secure by Letters Patent, is—

1. As a new article of manufacture, a fireproof building material consisting of a vehicle characterized as having a specific gravity of approximately .6 and being relatively rich in silicon oxid and capable of being reduced to a fine non-gritty powder, and a suitable binder.

2. As a new article of manufacture, a fireproof material consisting of a vehicle characterized by having a specific gravity of approximately .6 and containing approximately 50% of silicon oxid and containing not to exceed approximately 30% of aluminium oxid, and a suitable binder.

3. As a new article of manufacture, a fireproof material consisting of a vehicle characterized by having a specific gravity of approximately .6 and containing approximately 50% of silicon oxid and containing not to exceed approximately 30% of aluminium oxid, and a suitable binder, said vehicle and binder mingled in approximately the proportions of ten-parts of the vehicle to four-parts of the binder.

4. As a new article of manufacture, a fireproof material consisting of a vehicle characterized by having a specific gravity of approximately .6 and containing approximately 50% of silicon oxid and containing not to exceed approximately 30% of aluminium oxid, and a suitable binder, said vehicle and binder mingled in approximately the proportions of ten-parts of the vehicle to four-parts of the binder, said binder consisting of a mixture of clay and dead-burnt-gypsum.

In testimony whereof I have hereunto set my hand in presence of two subscribing witnesses.

KEIZO SAKURAI.

Witnesses:
  G. ABRAHAMSON,
  D. B. RICHARDS.